(12) United States Patent
Linzer

(10) Patent No.: US 7,853,968 B2
(45) Date of Patent: Dec. 14, 2010

(54) COMMERCIAL DETECTION SUPPRESSOR WITH INACTIVE VIDEO MODIFICATION

(75) Inventor: Elliot N. Linzer, Suffern, NY (US)

(73) Assignee: LSI Corporation, Milpitas, CA (US)

( * ) Notice: Subject to any disclaimer, the term of this patent is extended or adjusted under 35 U.S.C. 154(b) by 1713 days.

(21) Appl. No.: 10/725,743

(22) Filed: Dec. 2, 2003

(65) Prior Publication Data

US 2005/0120367 A1 Jun. 2, 2005

(51) Int. Cl.
*H04N 20/14* (2006.01)
(52) U.S. Cl. .................................................. 725/22
(58) Field of Classification Search ................. 725/42
See application file for complete search history.

(56) References Cited

U.S. PATENT DOCUMENTS

| | | | | |
|---|---|---|---|---|
| 5,119,082 A | | 6/1992 | Lumelsky et al. | 345/600 |
| 5,610,653 A | * | 3/1997 | Abecassis | 348/170 |
| 5,847,703 A | * | 12/1998 | Teicher et al. | 725/56 |
| 6,463,102 B1 | * | 10/2002 | Linzer | 375/240.29 |
| 6,469,749 B1 | * | 10/2002 | Dimitrova et al. | 348/722 |
| 6,698,020 B1 | * | 2/2004 | Zigmond et al. | 725/34 |
| 7,398,000 B2 | * | 7/2008 | Green | 386/46 |
| 2003/0001977 A1 | * | 1/2003 | Wang | 348/700 |
| 2003/0117530 A1 | * | 6/2003 | McGee et al. | 348/700 |
| 2003/0145320 A1 | * | 7/2003 | Vogel | 725/22 |
| 2003/0202773 A1 | | 10/2003 | Dow et al. | 386/46 |
| 2004/0161154 A1 | | 8/2004 | Hua et al. | 382/229 |
| 2005/0010944 A1 | | 1/2005 | Wright et al. | 725/22 |
| 2005/0128361 A1 | | 6/2005 | Li et al. | 348/701 |
| 2005/0185919 A1 | * | 8/2005 | Smith | 386/46 |

FOREIGN PATENT DOCUMENTS

JP 11136634 A 5/1999

* cited by examiner

*Primary Examiner*—Brian T Pendleton
*Assistant Examiner*—Cai Chen
(74) *Attorney, Agent, or Firm*—Christopher P. Maiorana, PC

(57) ABSTRACT

A method for processing a video signal, comprising the steps of (A) receiving the video signal comprising (i) a first segment having a series of frames each having a first region and a second region defining a first signature and (ii) a second segment having a series of frames each having a first region and a second region defining a second signature, (B) modifying each of the frames of the first segment from the first signature to a third signature and (C) modifying each of the frames of the second segment from the second signature to a fourth signature.

12 Claims, 5 Drawing Sheets

ORIGINAL IMAGE

SCALED IMAGE

SCALED AND CROPPED IMAGE

ORIGINAL IMAGE

IMAGE EXTRAPOLATED IN THE DIRECTION OF THE ARROWS

FINAL IMAGE WITH ACTIVE VIDEO IN ALL OF THE NOMINALLY ACTIVE REGION

COMMERCIAL DETECTION SUPPRESSOR WITH INACTIVE VIDEO MODIFICATION

CROSS REFERENCE TO RELATED APPLICATIONS

The present application may relate to co-pending application Ser. No. 10/713,441, filed Nov. 14, 2003, which is hereby incorporated by reference in its entirety.

FIELD OF THE INVENTION

The present invention relates to video generally and, more particularly, to a commercial detection suppressor with inactive video modification.

BACKGROUND OF THE INVENTION

Conventional video recording devices, such as video cassette recorders (VCRs), recordable DVD drives, and hard-disk based recorders, often contain a feature to detect commercial advertisements. A user often has the option to skip the detected commercials when playing back a recording.

Conventional approaches used to determine what is or is not a commercial look at characteristics of the video sequences to classify the material as being part of a main program or as being part of a commercial. Conventional methods include using average DC values or motion vectors to determine transitions between the program and the commercials.

While a viewer may wish to use a device that can allow him to watch a program without also viewing the commercial advertisements, a broadcaster has a vested interest in seeing that the commercial advertisements are viewed.

It would be desirable to implement a commercial detection suppressor that modifies an inactive portion of a video signal to deter commercial detection.

SUMMARY OF THE INVENTION

The present invention concerns a method for processing a video signal, comprising the steps of (A) receiving the video signal comprising (i) a first segment having a series of frames each having a first region and a second region defining a first signature and (ii) a second segment having a series of frames each having a first region and a second region defining a second signature, (B) modifying each of the frames of the first segment from the first signature to a third signature and (C) modifying each of the frames of the second segment from the second signature to a fourth signature.

The objects, features and advantages of the present invention include providing a commercial detection suppressor with inactive video modification that may (i) encode programs and commercial advertisements to reduce the ability of a commercial detection device to detect the commercials, and/or (ii) obscure the start of active video in at least one frame in the sequence.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may be used to process a video signal to intentionally obscure where a truly active video region starts. The modification to the video signal may prevent the detection of different segments based on the start of the truly active video.

Figure 1:
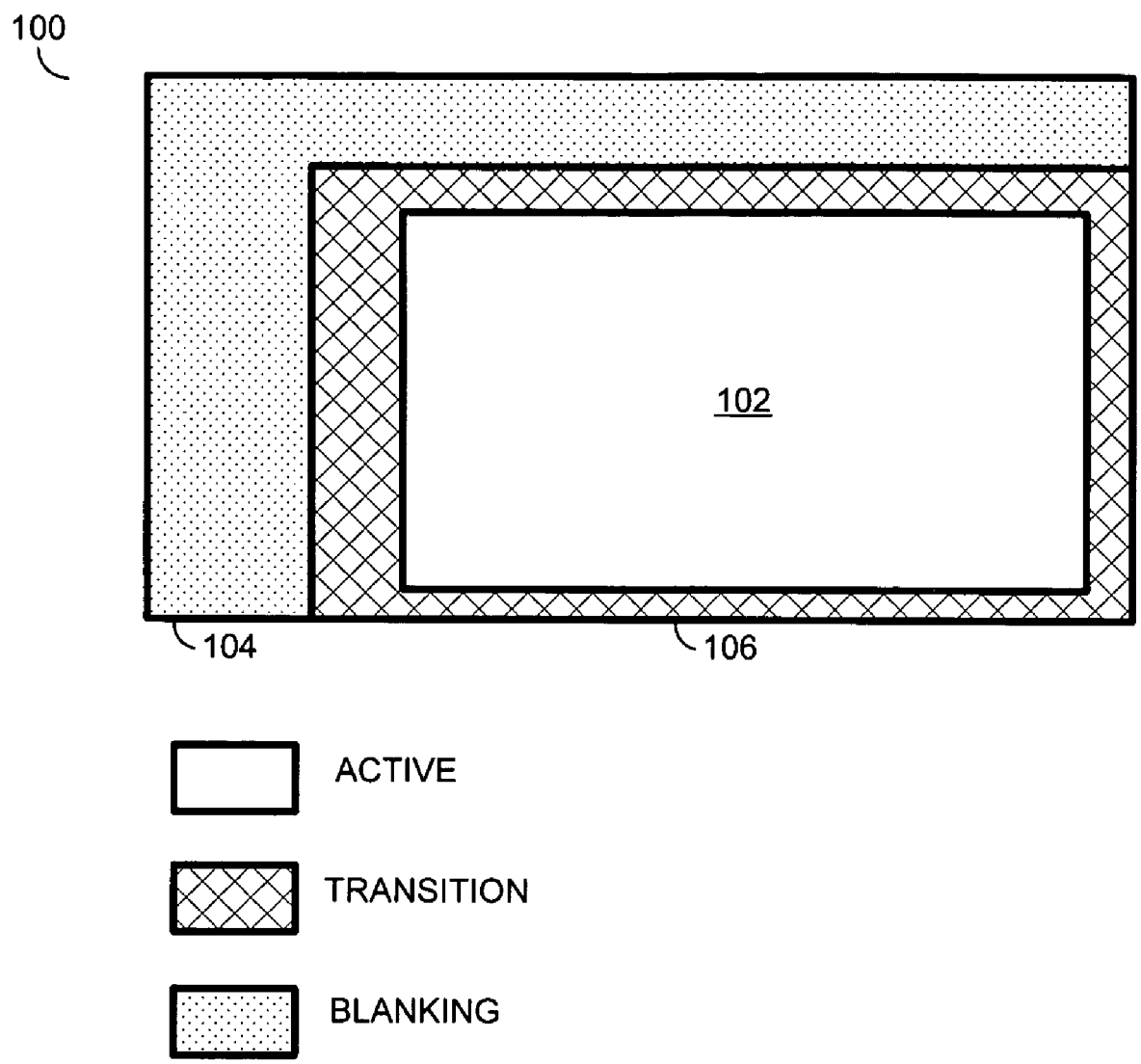
FIG. 1 illustrates various portions of a video frame.

Referring to FIG. 1, a frame 100 of a video signal is shown. In a video signal (such as a digital video signal), a number of frames are presented consecutively to a display device. The frame 100 generally comprises an active video portion (or region) 102, a blank video portion (or region) 104 and a transition video portion (or region) 106. The active video portion 102 is the part of the frame 100 that contains the picture that is displayed. The blank video portion 104 does not contain any video. The blank video portion is typically solid black, but may also hold non-video data (e.g., embedded audio, etc.). The blank video portion 104 is generally presented in the overscan area of a display device and is not normally viewable. Changes within the transition video portion 106 may occur, but within the portion of the frame 100 presented in the overscan portion to a display device.

In a CCIR signal, the active portion 102 and the transition portion 106 (which may be referred to as the nominally active region) is 720 pixels wide×483 pixels high. The active portion 102 of the video signal is in a somewhat smaller region (e.g., 700×475). Typically, up to 12 columns on the left and/or right side and up to 3-4 lines on the top and/or bottom may be black.

Figure 2A:
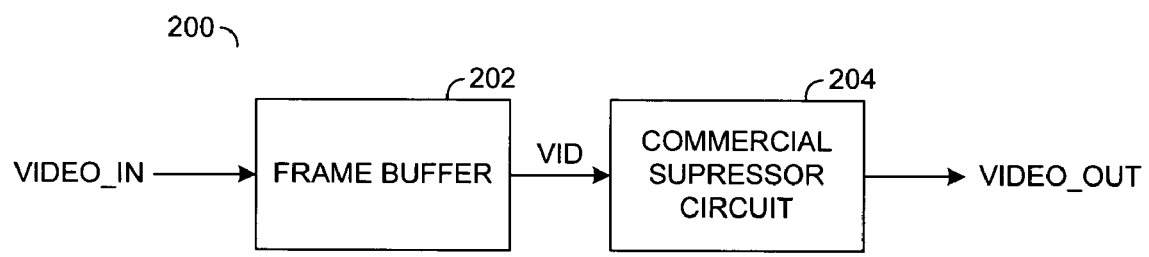
FIGS. 2A and 2B illustrate a system implementing the present invention.

Referring to FIG. 2, a system 200 illustrating a preferred embodiment of the present invention is shown. The system 200 generally comprises a block (or circuit) 202 and a block (or circuit) 204. The circuit 202 may be implemented as a frame buffer. The circuit 204 may be implemented as a commercial suppressor circuit. The frame buffer 202 may receive an input signal (e.g., VIDEO_IN). The signal VIDEO_IN generally comprises a series of frames presented sequentially. The frame buffer generally presents a signal (e.g., VID) to the commercial suppressor circuit 204. The commercial suppressor circuit 204 generally presents a signal (e.g., VIDEO_OUT). The signal VIDEO_OUT generally comprises a modified version of the signal VIDEO_IN that reduces the ability of a commercial detection device to detect the commercials. The modification to the signal VIDEO_IN will be described in more detail in connection with FIGS. 3-5.

Figure 2B:
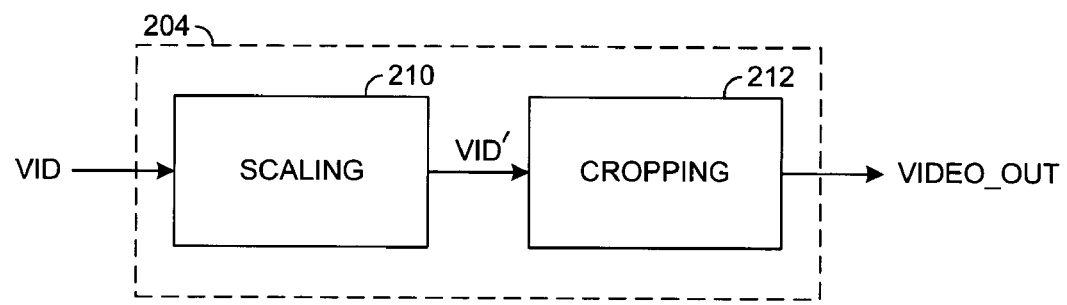

FIG. 2B illustrates a more detailed diagram of the commercial suppressor circuit 204. The commercial suppressor circuit 204 generally comprises a scaling circuit 210 and a cropping circuit 212. The scaling circuit 210 generally increases the size of each of the frames of the signal VID. The scaling circuit presents a signal VID' to the cropping circuit. The cropping circuit 212 generally crops each of the frames to a size equal to the frames of the signal VIDEO_IN. The signal VIDEO_OUT generally presents only the active portion 102 of each of the frames 100.

Figure 3A:
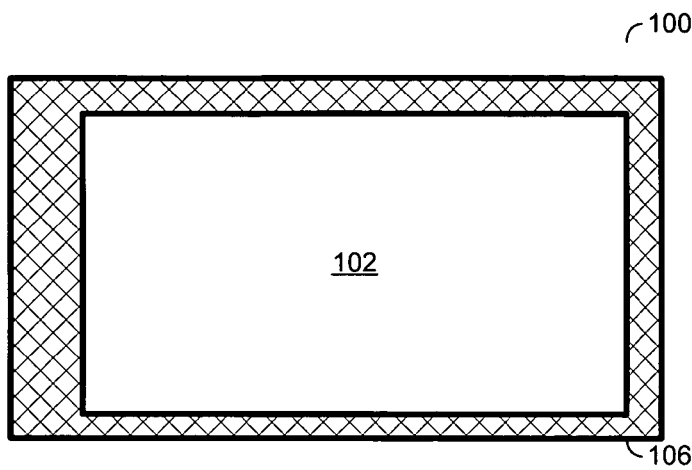
FIGS. 3A-3C illustrate examples of a modified frame.
Figure 3B:
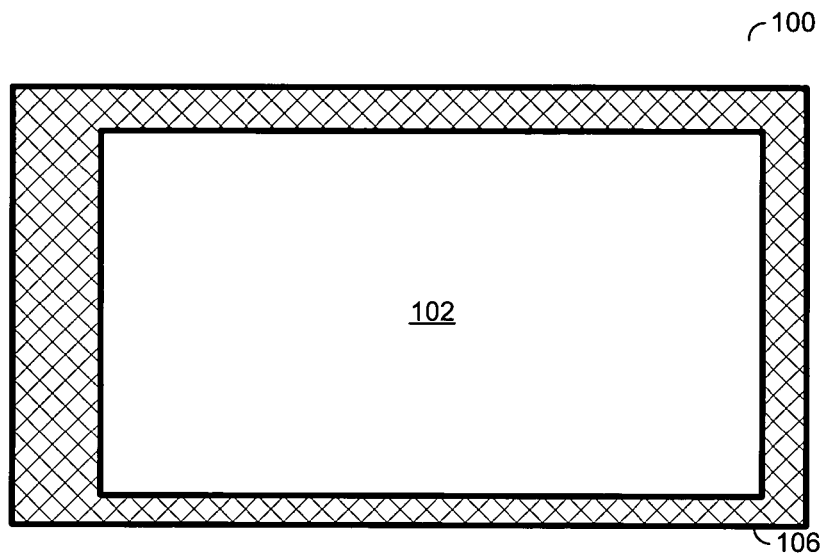
Figure 3C:
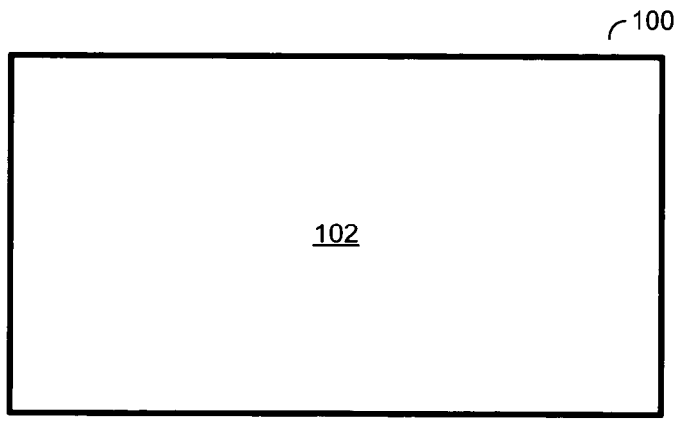

Referring to FIGS. 3A-3C, examples of a modified frame 100 are shown. FIG. 3A illustrates the original frame 100. FIG. 3B illustrates scaling the frame to a larger size. FIG. 3C illustrates cropping to the size of the frame to include only the active portion 102. In this way, the active video portion 102 will be present in the entire nominally active area (e.g., the whole nominally active area will be truly active).

Figure 4A:
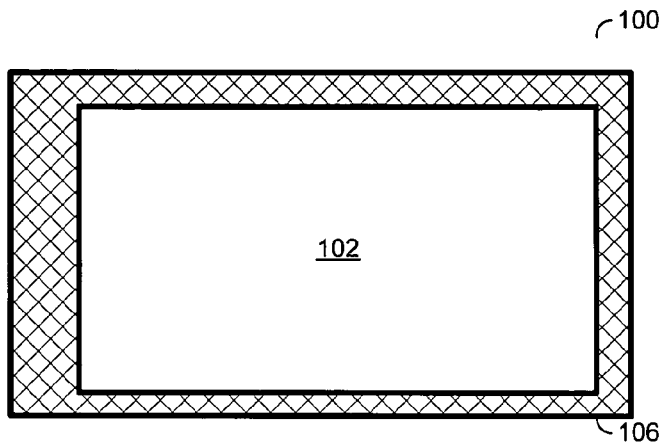
FIGS. 4A-4C illustrate examples of a modified frame.
Figure 4B:
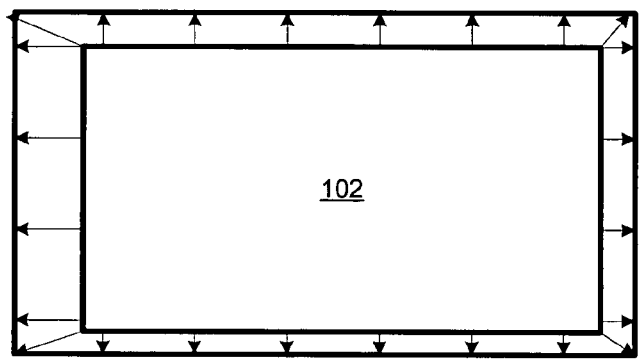
Figure 4C:
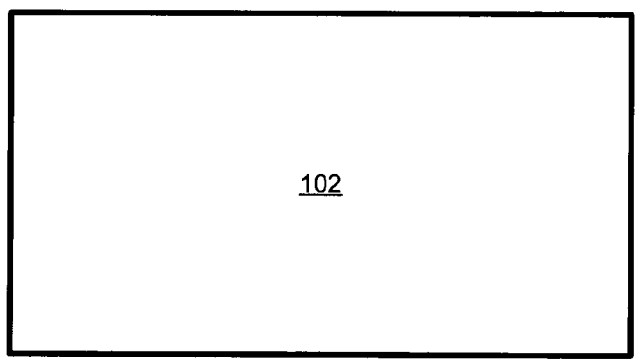

Referring to FIG. 4A-4C, examples of a modified frame 100 are shown. The frame 100 of FIG. 4 illustrates an alternate process for modifying the frames. The edge areas are normally filled with a solid color (probably black). FIG. 4A illustrates the original frame 100. FIG. 4B illustrates the active portion 102 being extrapolated in the direction of the arrows. FIG. 4C illustrates the active portion 102 covering all of the nominally active region. In this way, the filled-in areas will appear to be inactive, and all of the sent frames will have the same nominally active area (i.e., the area inside that which is filled in). The edge areas may be filled by extrapolating the active region 102 into the area that is nominally active but may be currently inactive.

Figure 5:
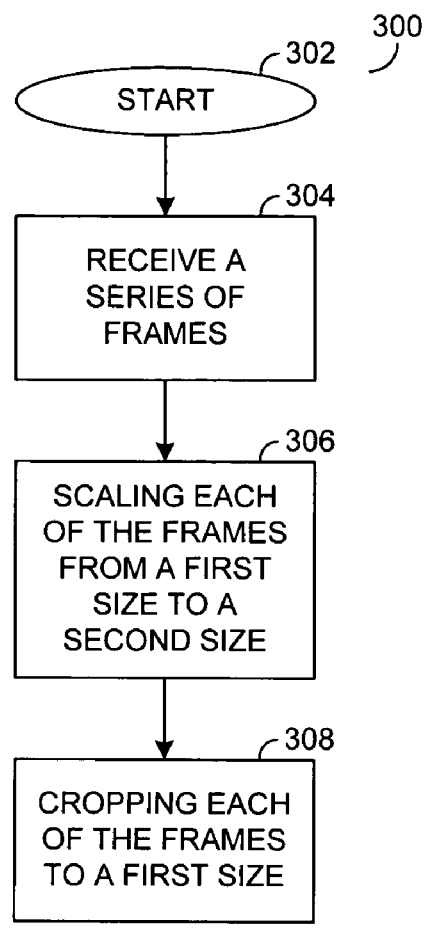
FIG. 5 is a flow chart illustrating an exemplary process of the present invention.

Referring to FIG. 5, a process 300 is shown. The process 300 generally compare a state 302, a state 304, a state 306 and a state 308. The state 302 may start the process 300. The state 302 may receive signal VIDEO_IN comprising a series of frames (e.g., the frame 100 of FIGS. 1, 3 and 4). Each frame generally has a first region and a second region. The state 304 may be used to scale each of the frames from a first size to a second size. The second size is generally larger than the first size. The state 306 may crop each of the frames to the first size. The cropped frames comprise only the first region equaling a size of the unprocessed frames.

Figure 6:
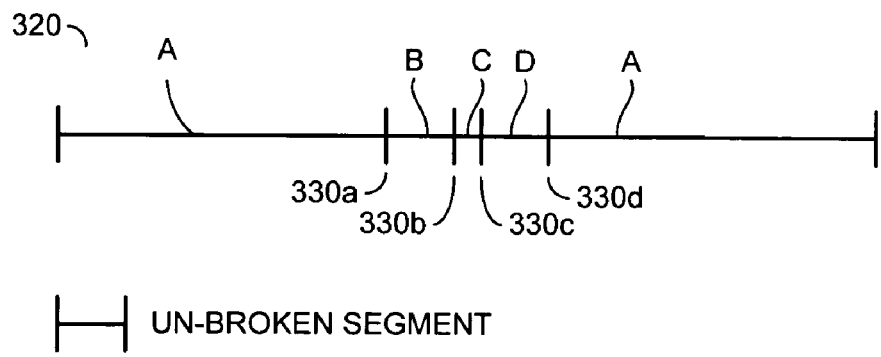
FIG. 6 is a diagram illustrating a number of segments.

Referring to FIG. 6, a video sequence 320 is shown illustrating a number of segments A-D. Each frame of each segment has a signature that may be represented as a 4-set (e.g., T, B, L, R). The frames within each of the segments A-D are normally the same. The video sequence 320 starts at the segment A, having a first 4-set. After the transition 330a, the video sequence 320 changes to the segment B. After the transition 320b, the video sequence 320 changes to the segment C. After the transition 330c, the video sequence 320 changes to the segment D. The segments B, C, and D are classified as commercials (or an otherwise undesirable portion of the video signal).

In one example, a video signal comprising 300 frames. The frames 1-100 may be segment containing program material having a signature of [7, 5, 3, 11]. The frames 101-200 may be a segment containing commercial material having a signature of [8, 2, 0, 4]. The frames 201-300 may be a segment containing program material having a signature of [7, 5, 2, 8]. The present invention may convert the signature for particular groups (e.g., G1-Gn) of frames. For example, each of the groups G1-Gn may comprise N frames. If N=50, then the process of the present invention may generate the following signature:

G1, frames 1-50 may have a signature of [3, 6, 0, 9].
G2, frames 51-100 may have a signature of [12, 8, 0, 0].
G3, frames 100-150 may have a signature of [0, 7, 2, 8].
G4, frames 151-200 may have a signature of [8, 2, 2, 4].
G5, frames 201-250 may have a signature of [7, 2, 8, 5].
G6, frames 251-300 may have a signature of [6, 1, 7, 4].

In such an example, the signatures of each of the groups G1-G6 are different and do not repeat. Since none of the signatures repeat, the nature of the commercial material is hidden from potential commercial detection systems. The signature of each of the subsequent groups (e.g., G7-Gn) may repeat the pattern of the signatures of the groups G1-G5. By selecting a particular number of the groups G1-Gn to repeat, additional protection against commercial detection may result. In particular, if the group G7 has the same signature as the group G1, and the group G7 is commercial material, while the group G1 is program material, a commercial detection circuit would not be able to detect the commercial.

The present invention may be used to fool detection devices. The present invention may be useful in broadcast equipment. For example, preventing competitors from defeating a commercial detection system, such as described in the cited co-pending application, may provide a strategic advantage.

While the invention has been particularly shown and described with reference to the preferred embodiments thereof, it will be understood by those skilled in the art that various changes in form and details may be made without departing from the spirit and scope of the invention.

The invention claimed is:

1. A method for processing a video signal, comprising the steps of:
   (A) receiving said video signal comprising (i) a first segment having a series of frames, wherein (a) each of said frames of said first segment has a first region and a second region, and (b) said first region and said second region of said first segment define a first signature for each of said frames of said first segment and (ii) a second segment having a series of frames, wherein (a) each of said frames of said second segment has a first region and a second region, and (b) said first region and said second region of said second segment define a second signature for each of said frames of said second segment;
   (B) sequentially modifying all of said first signatures of all said frames of said first segment to a third signature, wherein said first segment comprises a non-commercial program; and
   (C) sequentially modifying all of said second signatures of all said frames of said second segment to a fourth signature.

2. The method according to claim 1, wherein said second signature is equal to said fourth signature.

3. The method of claim 1, wherein (i) said second segment comprises a commercial program and (ii) said signature modification is performed to suppress the detection of commercials in said video signal.

4. The method according to claim 1, wherein transitions between said first and second segments are not detectable.

5. The method according to claim 1, wherein said modifying in steps (B) and (C) comprises:
   (i) scaling each of said frames to a first size, wherein after scaling each of said frames, said first region of each of said scaled frames is equal to a size of said first region and said second region of said frame prior to scaling each of said frames and (ii) cropping each of said scaled frames, wherein said cropped frames comprise only said first region of said scaled frame and said first region of said scaled frame is equal to the size of each of said frames prior to scaling each of said frames.

6. The method according to claim 5, wherein said first size fills said first region.

7. The method according to claim 1, wherein said video signal comprises a digital video signal.

8. The method according to claim 1, wherein said first region comprises an active region.

9. The method according to claim 1, wherein said modifying in steps (A) and (B) comprises:
   obscuring a start of an active video in at least one of said frames.

10. The method according to claim 1, wherein:
    step (C) comprises modifying said frames of said second segment from said second signature to said first signature.

11. An apparatus for processing a video signal comprising:
    a circuit configured to receive said video signal comprising (i) a first segment having a series of frames, wherein (a) each of said frames of said first segment has a first region and a second region, and (b) said first region and said second region of said first segment define a first signature for each of said frames of said first segment and (ii) a second segment having a series of frames, wherein (a) each of said frames of said second segment has a first region and a second region, and (b) said first region and said second region of said second segment define a second signature for each of said frames of said second segment, wherein said circuit (i) sequentially modifies all of said first signatures of all said frames of said first segment to a third signature and (ii) sequentially modifies all of said second signatures of all of said frames of said second segment to a fourth signature, wherein said first segment comprises a non-commercial program.

12. The apparatus according to claim 11, wherein said video signal comprises a digital video signal.

\* \* \* \* \*